May 19, 1925.
J. A. ANGLADA
MOTOR VEHICLE
Filed March 16, 1922
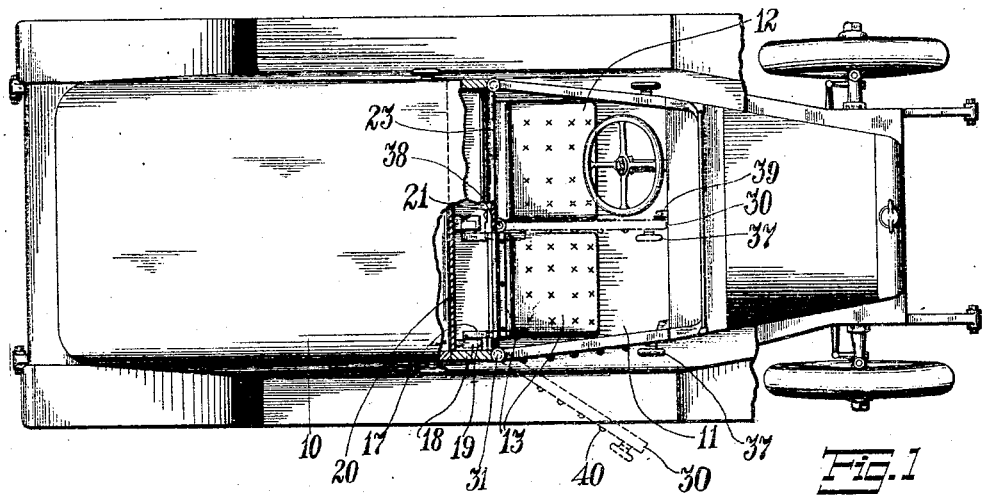
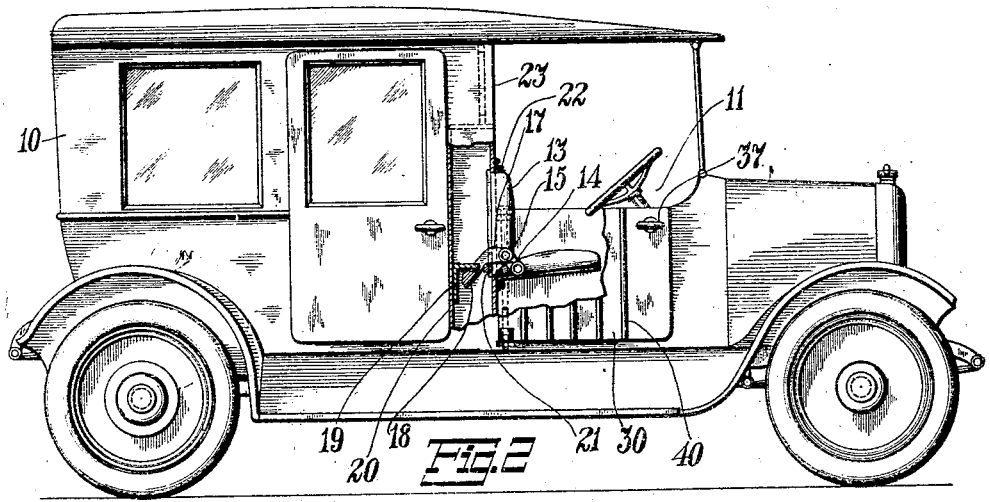
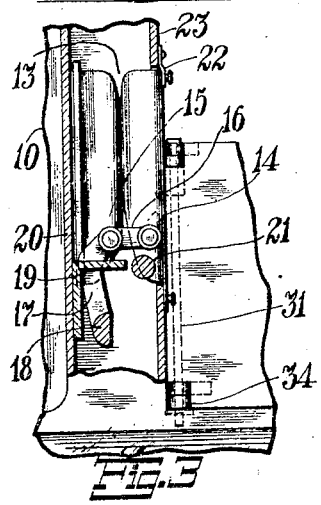
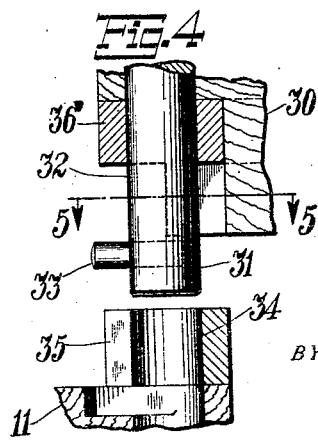
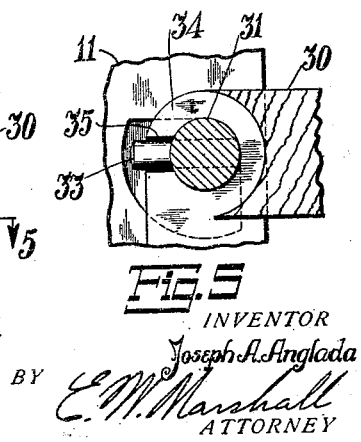
INVENTOR
Joseph A. Anglada
BY E. W. Marshall
ATTORNEY Patented May 19, 1925.

1,538,080

UNITED STATES PATENT OFFICE.

JOSEPH A. ANGLADA, OF JENKINTOWN, PENNSYLVANIA, ASSIGNOR TO ELECTROCAR CORPORATION, OF NEW YORK, N. Y., A CORPORATION OF DELAWARE.

MOTOR VEHICLE.

Application filed March 16, 1922. Serial No. 544,347.

*To all whom is may concern:*

Be it known that I, JOSEPH A. ANGLADA, a citizen of the United States, and a resident of Jenkintown, county of Montgomery, and State of Pennsylvania, have invented certain new and useful Improvements in Motor Vehicles, of which the following is a specification.

This invention relates to motor vehicles and particularly to vehicles of the type used as taxi cabs.

In some cities the city ordinances require taxi cabs to provide a space for carrying trunks. This requirement is commonly complied with by providing a space in the front compartment at the side of the driver's seat. This construction, however, limits the passenger carrying capacity of the vehicle and in case no baggage is to be transported reduces the revenue of the taxi cab.

The object of this invention is to provide a vehicle so constructed as to comply with baggage transporting ordinances such as that mentioned by providing a space for baggage but further so constructed that this space may be utilized for carrying passengers when no baggage is to be transported and to enclose the driver's feet and limbs.

Another object of the invention is to provide a motor vehicle with a detachable door to facilitate the transporting of baggage and to further provide means for supporting the door when the latter is detached from its usual supporting means on the vehicle body.

Further objects of the invention will appear from the following specification taken in connection with the drawings which form a part of this application and in which—

Fig. 1 is a top plan view, partly broken away and partly in section of a taxi cab constructed in accordance with my invention.

Fig. 2 is a side elevation of the construction shown in Fig. 1, parts being broken away and other parts being shown in section.

Fig. 3 is an enlarged sectional elevation showing the folding seat construction.

Fig. 4 is an enlarged detail sectional plan view showing the hinge construction for the door and Fig. 5 is an enlarged sectional elevation taken at right angles to Fig. 4 and illustrating the hinge construction, and taken on line 5—5 of Fig. 4.

The invention may be briefly described as comprising a motor vehicle having front and rear compartments and a driver's seat disposed at one side of the front compartment. The door as the side of the front compartment remote from the driver's seat is so hinged to the body as to be detachable therefrom in one position and means is provided for supporting the door in the front compartment adjacent the driver's seat to permit the space in the front compartment at the side of the driver's seat to be utilized for the transportation of baggage. In order to utilize this space when no baggage is to be carried, a seat is foldably mounted in a position to swing down into the space at the side of the driver's seat.

Referring to the drawings, I have shown a motor vehicle having a rear or passenger compartment 10 and a front compartment 11. The driver's seat 12 is located at one side of the front compartment and at the other side of the front compartment there is mounted a foldable seat 13. The seat 13 comprises a pair of members 14 and 15 pivotally connected by link 16. The member 15 also has an arm 17 secured thereto and the arm 17 has a lug 18 adapted to engage a bracket 19 fixedly secured to a frame member 20 of the vehicle. The parts just described are duplicated at both sides of the seat. A cross rod 21 is also fixed to the vehicle body and when the parts are in the position shown in Figs. 1 and 2, the arms 17 engage the cross rod and the lugs 18 engage the brackets 19. A latch 22 is carried by the rear wall 23 of the front compartment and retains the seat 13 in folded position, as shown in Fig. 3. Any other form of folding seat may be used if desired and the particular form illustrated has been shown and described merely for the purpose of disclosing one practical embodiment of the invention.

In order to permit the use of the space at the side of the driver's seat in the front compartment for carrying baggage, the door 30 remote from the driver's seat is mounted in such a manner that it can be readily detached from the hinge members on the body and be supported within the compartment at the side of the driver's seat. This mounting comprises hinge members 31 carried by the door and having a pivot shank 32 and a laterally extending pin 33 carried by the shank. The shank 32 is adapted to enter hinge member 34 formed on the body and to permit the entry of the pin 33 a slot 35 is formed in the hinge member 34. When the hinge parts just described are assembled a sleeve or bushing 36 surrounding the shank 32 is adapted to engage the hinge member 34 and permit the door to be swung to its open position. As illustrated in Fig. 4 the slot 35 in the hinge member 34 is so positioned that the pin 33 will come into alinement with the slot when the door is in its open position. Therefore, in order to remove the door from its mounting on the body the door must be swung to open position whereupon it may be lifted out of the complementary body hinge members. A door latch 37 of the usual construction is provided on the door for retaining the door in closed position.

When the space at the side of the driver's seat is to be utilized for carrying baggage, the door 30 is removed from the hinge members on the body and is supported as shown in Fig. 1 in a position adjacent the driver's seat. In order to support the door in this position hinge members 38 corresponding to the members 34 on the body are mounted on the rear wall 23 of the front compartment and a latch member 39 adapted to coact with the door latch 37 is mounted also in the front compartment. In order, moreover, to protect the door when baggage is being transported and to provide facilities for securing the baggage such as a trunk in place, the outside of the door has mounted thereon a plurality of reinforcing bars 40.

It will be understood without further detailed description that the door 30 is mounted in the hinge members 38 in the same manner as the hinge members 34 already described. Furthermore a detailed description of the operation of the structure is deemed unnecessary in view of the explanation already given.

From the above specification it will be seen that a motor vehicle has been so designed as to facilitate the carrying of baggage thereon and that this construction does not limit the passenger carrying capacity of the vehicle since the baggage space can be utilized for carrying passengers when no baggage is to be transported.

Although one specific embodiment of the invention has been illustrated and described, it will be understood that the invention is capable of modification and that changes in the construction and in the arrangement of the various cooperating parts may be made without departing from the spirit or scope of the invention as expressed in the following claim.

What I claim is:

In a motor vehicle, a body, hinge members thereon, a door having complementary hinge members adapted to engage and coact with the body hinge members, said hinge members being so constructed and arranged that the door can be lifted out of the body hinge members when the door is swung on its hinges to open position, a front compartment in the vehicle, a driver's seat in said compartment and extending across a portion thereof, a folding seat disposed in the remaining portion of the compartment and arranged to swing rearwardly into the rear wall of the compartment, and hinge members corresponding to the body hinge members within the vehicle and disposed in the front vehicle compartment adjacent the driver's seat, for supporting the door when detached from the body.

In witness whereof, I have hereunto set my hand this 26th day of January, 1922.

JOSEPH A. ANGLADA.